United States Patent
Shinohara (10) Patent No.: US 10,451,886 B2
(45) Date of Patent: Oct. 22, 2019

(54) STEREOSCOPIC DISPLAY DEVICE

(71) Applicant: OMRON Corporation, Kyoto-shi, Kyoto (JP)

(72) Inventor: Masayuki Shinohara, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/535,593

(22) PCT Filed: Mar. 8, 2017

(86) PCT No.: PCT/JP2017/009299
§ 371 (c)(1),
(2) Date: Jun. 13, 2017

(87) PCT Pub. No.: WO2017/154993
PCT Pub. Date: Sep. 14, 2017

(65) Prior Publication Data
US 2018/0045970 A1    Feb. 15, 2018

(30) Foreign Application Priority Data

Mar. 10, 2016 (JP) .................... 2016-046964

(51) Int. Cl.
*G02B 27/22* (2018.01)
*G02B 6/00* (2006.01)
*G03B 35/18* (2006.01)
*G03B 35/26* (2006.01)
(Continued)

(52) U.S. Cl.
CPC .............. *G02B 27/22* (2013.01); *G02B 6/00* (2013.01); *G02B 6/0036* (2013.01);
(Continued)

(58) Field of Classification Search
CPC .... G02B 6/005; G02B 6/0051; G02B 6/0053; G02B 6/0013; G02B 27/22
(Continued)

(56) References Cited

U.S. PATENT DOCUMENTS 5,659,410 A * 8/1997 Koike .................. G02B 6/0046
349/62
5,966,192 A * 10/1999 Higuchi ............... G02B 6/0053
349/61
(Continued)

FOREIGN PATENT DOCUMENTS

JP    2003-107402 A    4/2003
JP    2007-240965 A    9/2007
(Continued)

OTHER PUBLICATIONS

Written Opinion of the International Searching Authority dated May 16, 2017 in PCT international application, PCT/JP2017/009299 (English translation of the Written Opinion will be issued and uploaded to PATENTSCOPE of WIPO.).

*Primary Examiner* — Audrey Y Chang
(74) *Attorney, Agent, or Firm* — Metrolex IP Law Group, PLLC (57) ABSTRACT

A stereoscopic display device includes an image display device to display, for each imaging point inside a space region, an image of an object to be projected to the space region at the relevant imaging point in a block corresponding to the relevant imaging point on a display region, a lens to direct light beams given out from the respective blocks to mutually different directions, a light guide plate having first deflectors provided in any of an emission surface and a surface opposed to the emission surface, each of the first deflectors directing the light beams entering the light guide plate to mutually different directions to emit the light beams from the emission surface, and a second deflector configured
(Continued)

to direct, for each of the first deflectors, the light beam from each of the blocks emitted from the emission surface through the first deflector to the corresponding imaging point.

4 Claims, 6 Drawing Sheets

(51) Int. Cl.
*F21V 8/00* (2006.01)
*H04N 13/395* (2018.01)
*H04N 13/363* (2018.01)

(52) U.S. Cl.
CPC ......... *G02B 6/0053* (2013.01); *G02B 27/225* (2013.01); *G03B 35/18* (2013.01); *G03B 35/26* (2013.01); *H04N 13/363* (2018.05); *H04N 13/395* (2018.05)

(58) Field of Classification Search
USPC ....... 345/6, 7; 385/146, 120; 362/51, 606, 1, 362/600, 608, 617, 23.16, 326, 607; 359/463, 462
See application file for complete search history.

(56) References Cited

U.S. PATENT DOCUMENTS

| | | | | |
|---|---|---|---|---|
| 5,982,342 A * | 11/1999 | Iwata | ................. | G02B 27/2214 345/7 |
| 6,222,971 B1 * | 4/2001 | Veligdan | .................. | G02B 6/08 385/120 |
| 8,899,815 B2 * | 12/2014 | Chen | .................... | G02B 6/0016 362/606 |
| 2003/0020879 A1 | 1/2003 | Sonehara | | |
| 2014/0268327 A1 | 9/2014 | Dunn et al. | | |
| 2015/0242943 A1 * | 8/2015 | Abovitz | ............ | G06K 9/00671 705/27.2 |

FOREIGN PATENT DOCUMENTS

| | | |
|---|---|---|
| JP | 2007-304609 A | 11/2007 |
| JP | 2011-113695 A | 6/2011 |
| JP | 2014-98873 A | 5/2014 |
| WO | 2009131128 A1 | 10/2009 |
| WO | 2014120194 A1 | 8/2014 |

\* cited by examiner

STEREOSCOPIC DISPLAY DEVICE

TECHNICAL FIELD

The present invention relates to a stereoscopic display device capable of projecting a stereoscopic image in the air.

BACKGROUND ART

Conventionally, there has been studied a stereoscopic display device configured to project, in the air, a stereoscopic image that an observer can visually recognize without using an instrument dedicated for observing the stereoscopic image such as polarized glasses (for example, refer to Patent Documents 1 to 3).

For example, the stereoscopic display device disclosed in Patent Document 1 has a synthetic stereoscopic image formed electronically, an imaging unit to reproduce a real image of the synthetic stereoscopic image, and a focusing device to almost match a focal position of eyes of an observer with a position of the real image. Further, this stereoscopic display device has a z-direction scanning unit, a rotary scanning unit, and a matrix type display as a formation unit of the synthetic stereoscopic image in order to increase display performance.

Moreover, a stereoscopic two-dimensional image display device disclosed in Patent Document 2 has an image transmission panel, an imaging portion display object, and a housing. The image transmission panel is disposed parallel to, and apart from an image display surface, and is made up of a microlens array made up of a plurality of lenses and having a valid area wider than that of an image to be displayed, and a lens frame region surrounding a periphery of the valid region of the microlens array. The image transmission panel generates an imaging surface configured to display a real image of a two-dimensional image in a space on an opposite side of a display unit of the microlens array and located in front of the lens frame region. The imaging portion display object is disposed in the vicinity of the imaging surface, and the housing encloses an optical path between the display unit and the image transmission panel to make the optical path dark.

Further, an optical imaging device disclosed in Patent Document 3 uses first and second light control panels formed by arranging a great number of band-shaped flat light reflectors side by side at a constant pitch in a surface on one side of a transparent flat plate inside the transparent flat plate. One-surface sides of the respective first light control panel and second light control panel are disposed in opposition to one another so that the flat light reflectors are perpendicular to one another.

PRIOR ART DOCUMENTS

Patent Documents

Patent Document 1: Japanese Unexamined Patent Publication No. 2003-107402
Patent Document 2: Japanese Unexamined Patent Publication No. 2007-304609
Patent Document 3: WO 2009/131128

SUMMARY OF THE INVENTION

Problems to be Solved by the Invention

However, in the stereoscopic display device disclosed in Patent Document 1, since the matrix type display is required to be mechanically scanned for forming the synthetic stereoscopic image, the whole device is complicated.

Moreover, in the stereoscopic two-dimensional display device disclosed in Patent Document 2, the real image of the two-dimensional image displayed in the image display surface is merely formed by the microlens array, so that a stereoscopic image in a real sense is not projected in the air.

Further, in the optical imaging device disclosed in Patent Document 3 as well, since light beams emitted from each point on an object to be projected are imaged at a corresponding point on a projected image, the projected image does not become a stereoscopic image, unless the object itself has a three-dimensional shape.

Consequently, an object of the present invention is to provide a stereoscopic display device capable of projecting a stereoscopic image of an object in the air without using the object to be projected itself.

Means for Solving the Problems

As one embodiment of the present invention, a stereoscopic display device is provided. This stereoscopic display device includes: an image display unit configured to display, with respect to each of a plurality of imaging points inside a predetermined space region, an image of an object to be projected to the predetermined space region at the relevant imaging point, in a block corresponding to the relevant imaging point of a plurality of blocks obtained by dividing a display region; a first lens configured to make light beams given out from each of the plurality of blocks of the image display unit into light beams directed in mutually different directions; a light guide plate that is a transparent member and is formed into a plate shape, the light guide plate having an incident surface opposed to the image display unit through the first lens, and a plurality of first deflectors provided in any of an emission surface as one surface of the light guide plate, and a surface opposed to the emission surface, the plurality of first deflectors configured to direct the light beams given out from each of the plurality of blocks and entering the light guide plate from the incident surface in the mutually different directions and to emit the light beams from the emission surface; and a second deflector disposed so as to be opposed to the emission surface of the light guide plate, the second deflector configured to direct, with respect to each of the plurality of first deflectors, the light beams from each of the plurality of blocks emitted from the emission surface through the relevant first deflectors to the corresponding imaging point of the plurality of imaging points.

In this stereoscopic display device, it is preferable that the first lens collimates the light beams given out from each of the plurality of blocks of the image display unit in at least directions perpendicular to a longitudinal direction of the incident surface of the light guide plate to make the light beams into the light beams directed in mutually different directions.

Moreover, in this stereoscopic display device, it is preferable that the second deflector has a prism or a second lens with respect to each of the plurality of first deflectors, the prism or the second lens configured to direct the light beams to the corresponding imaging point of the plurality of imaging points in a unit of the light beams from each of the plurality of blocks emitted from the emission surface through the relevant first deflector.

Moreover, in this stereoscopic display device, it is preferable that by transforming coordinates of each point of the object represented in a first coordinate system to coordinate values of a second coordinate system set in the predetermined space region, the image display unit specifies the point of the object at each of the plurality of imaging points to display the image of the object at the specified point in the corresponding block.

Effect of the Invention

A display device according to the present invention exerts an effect of enabling a stereoscopic image of an object to be projected in the air without using the object to be projected itself.

MODE FOR CARRYING OUT THE INVENTION

Hereinafter, a stereoscopic display device according to an embodiment of the present invention will be described with reference to the drawings. This stereoscopic display device has a flat plate-shaped light guide plate, and an image display device disposed so as to be opposed to an incident surface formed in one side wall of the light guide plate. A display region of a display that the image display device has is divided into a plurality of blocks, and each of the blocks corresponds to any of a plurality of imaging points set inside a space region to which a stereoscopic image of an object is projected. The image display device displays an image of the object at the imaging point corresponding to the block for each of the blocks. Light beams given out from each of the blocks are collimated by a collimate lens disposed between the image display device and the incident surface, and enter an inside of the light guide plate from the incident surface. The collimated light beams from each of the blocks are reflected by a plurality of prisms formed in a diffusion surface, which is a surface on an opposite side of an emission surface. The emission surface is a surface of the light guide plate on a side opposed to an observer. The reflected light beams are emitted from the light guide plate in mutually different directions through the emission surface. The light beams from each of the blocks, which have been emitted from the light guide plate, are directed to the corresponding imaging point by a prism array provided for each of the prisms of the light guide plate. This allows the stereoscopic image of the object to be projected by the light beams condensed on each of the imaging points from each of the prisms.

Hereinafter, for convenience of description, the side opposed to the observer is defined as front, and an opposite side thereof is defined as rear.

Figure 1:
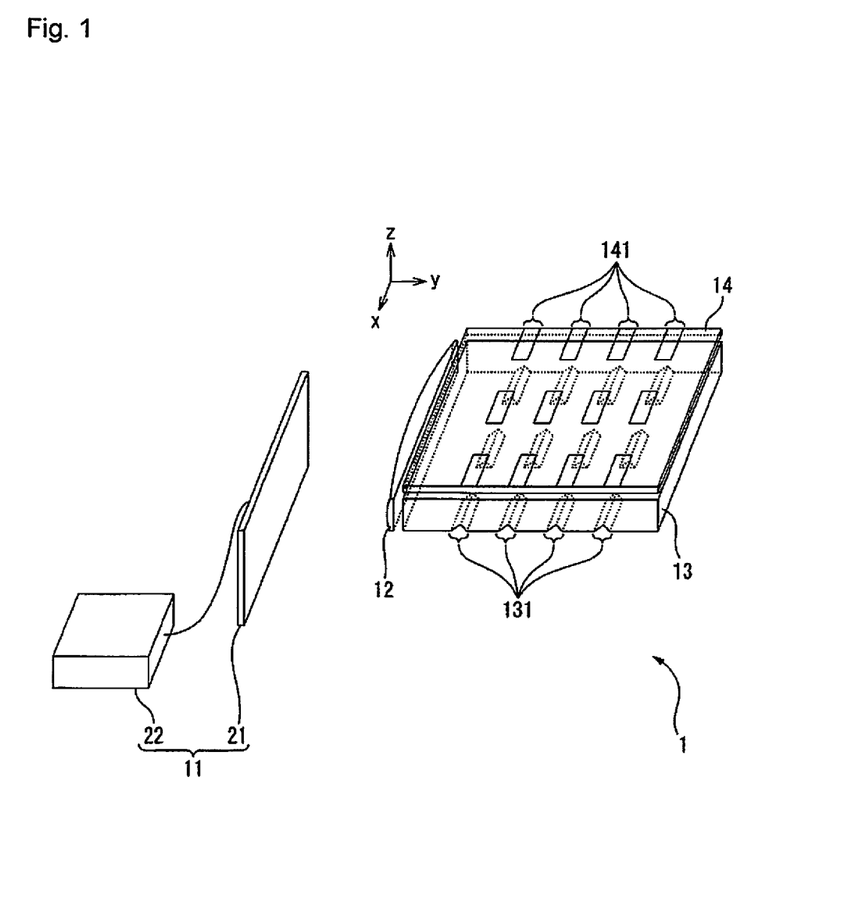
FIG. 1 is a schematic configuration view of a stereoscopic display device according to one embodiment of the present invention.
Figure 2:
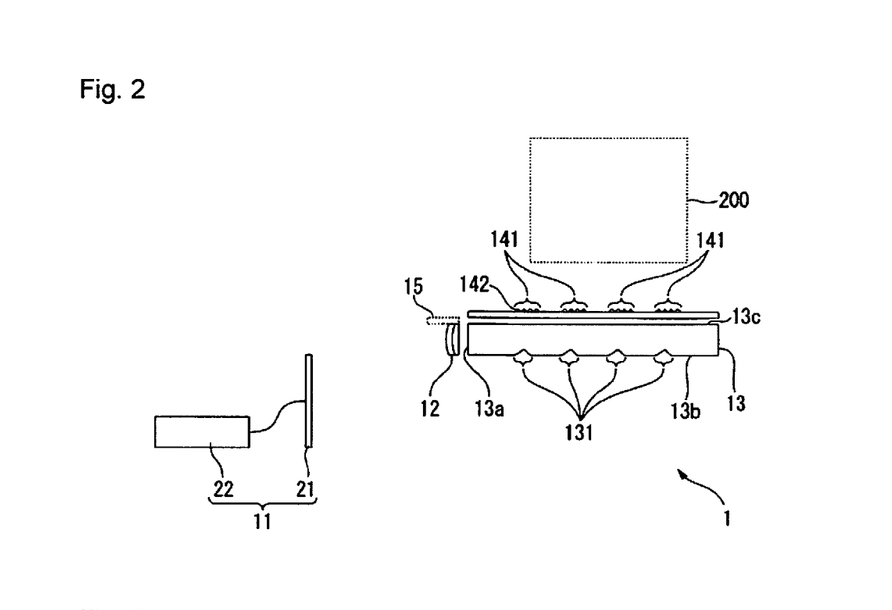
FIG. 2 is a schematic side view of the stereoscopic display device according to a first embodiment of the present invention.

FIG. 1 is a schematic configuration view of a stereoscopic display device according to one embodiment of the present invention. FIG. 2 is a schematic side view of the stereoscopic display device. A stereoscopic display device 1 has an image display device 11, a collimate lens 12, a light guide plate 13, and a prism array sheet 14. In the following, a direction parallel to a longitudinal direction of an incident surface 13a of the light guide plate 13 is defined as an x direction, and a normal line direction of the incident surface 13a is defined as a y direction in a surface parallel to a diffusion surface 13b located on a rear side of the light guide plate 13. Moreover, a normal line direction of the diffusion surface 13b and an emission surface 13c located on a front side of the light guide plate 13 is defined as a z direction. It should be noted that each of the following figures illustrates an outline of disposition relations of respective components in the stereoscopic display device, and does not illustrate actual dimensions and a number of prisms or the like.

The image display device 11 is one example of an image display unit, and has, for example, a two-dimensional display 21 and a control device 22. The two-dimensional display 21 and the control device 22 are connected by a video cable.

The two-dimensional display 21 has, for example, a liquid crystal display or an organic EL display. A display region on the two-dimensional display 21 is divided into a plurality of blocks, and each of the blocks one-to-one corresponds to any of the plurality of imaging points set inside a space region 200 to which the stereoscopic image is projected by the stereoscopic display device 1. That is, an image of an object displayed in each of the blocks is projected on the imaging point inside the space region 200 corresponding to the relevant block by the stereoscopic display device 1.

The control device 22 has, for example, one or a plurality of processors, a graphic board, a volatile or nonvolatile semiconductor memory circuit, and a communication interface to communicably connect external equipment and the control device. The control device 22 may further have an access device to access a magnetic recording medium or an optical recording medium.

The control device 22 stores three-dimensional data of the object to be projected, or acquires the three-dimensional data of the object from another equipment (not illustrated) through the communication interface. The three-dimensional data of the object includes, for example, coordinate values of each point of the object in a three-dimensional orthogonal coordinate system as a reference (hereinafter, simply referred to as a reference coordinate system), information of a color and a luminance of each point, information of a direction as a reference (e.g., information represented by two reference points set in the object), and information of sizes (e.g., vertical, horizontal, and depth sizes).

The control device 22 displays the image of the object in the two-dimensional display 21 in a form that enables the stereoscopic display device 1 to project the stereoscopic image of the object on the basis of the three-dimensional data of the object to be projected. For example, the control device 22 decides the sizes, the direction, and the position of the stereoscopic image of the object inside the space region in accordance with a control signal received from another equipment (not illustrated). The control device 22 performs affine transformation from the coordinate values of each point of the object from values in the reference coordinate system to values in a three-dimensional orthogonal coordinate system (hereinafter, simply referred to as a space coordinate system) set in the space region so that the sizes, the direction, and the position of the object have the decided values. Respective coefficients of the affine transformation are calculated, for example, on the basis of coordinate values of the reference points, the information of the direction and the information of the sizes included in the three-dimensional data of the object, and corresponding information included in the control signal.

The control device 22 specifies a point of the object corresponding to each of the imaging points inside the space region when the object is projected to the space region, on the basis of the coordinate values of each point of the object in the space coordinate system. Referring to the three-dimensional data and a correspondence relation between each of the imaging points and each of the blocks stored beforehand, the control device 22 causes the image of the point of the object at the imaging point to be displayed in the corresponding block on the display region of the two-dimensional display 21 for each of the imaging points. The block may correspond to one pixel of the two-dimensional display 21, or may include a plurality of pixels continuous in at least one of the x direction and the z direction.

Figure 3:
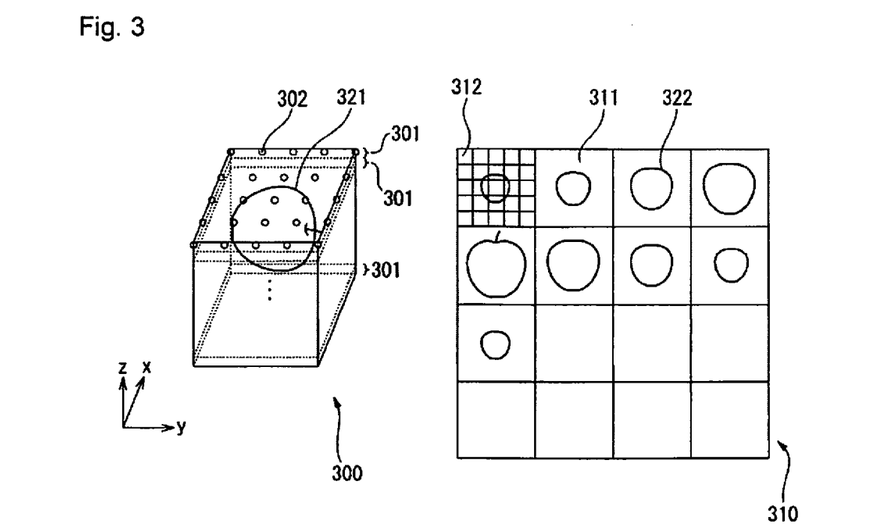
FIG. 3 is a view illustrating one example of a correspondence relation between each block set in a display region of a two-dimensional display, and each imaging point inside a space region to which a stereoscopic image is projected.

FIG. 3 is a view illustrating one example of the correspondence relation between each of the blocks set in the display region of the two-dimensional display 21, and each of the imaging points inside the space region to which the stereoscopic image is projected.

A space region 300 has, for example, sizes of 80 mm along the z direction, and 125 mm along the respective x direction and y direction. The space region 300 is divided into 16 partial regions 301 along the z direction, and in each of the partial regions 301, five imaging points 302 are set along each of the x direction and they direction, that is, a total of 25 imaging points 302 are set. In FIG. 3, for simplification, only the imaging points 302 in one of the partial regions 301 are illustrated. Meanwhile, a display region 310 of the two-dimensional display 21 is also divided into an equal number of large blocks 311 to the division number in the z direction of the space region 300 (in this example, four in the x direction×four in the z direction=16). Each of the plurality of large blocks 311 one-to-one corresponds to any of the partial regions 301. While in the display region 310, arrangement order of the large blocks 311 is arbitrary, for example, the large blocks 311 corresponding to the partial regions 301 closer to the observer in the space region 300 are sequentially arranged in raster scan order.

Each of the large blocks 311 is divided into an equal number of blocks 312 to a number of the imaging points included in the corresponding partial region 301 (in this example, five in the x direction×five in the z direction=25). Each of the blocks 312 inside each of the large blocks 311 one-to-one corresponds to any of the imaging points 302 in the partial region 301 inside the space region 300 corresponding to the large block 311. Accordingly, in each of the blocks 312, the image of the object to be projected at the corresponding imaging point 302 in the space region 300 may be displayed. While arrangement order of the respective blocks 312 is arbitrary, the respective blocks 312 are arranged, for example, in the same order as arrangement order of the imaging points 302 inside the corresponding partial region 301, Accordingly, when a stereoscopic image 321 of a predetermined object is projected to the space region 300, in each of the large blocks 311, a portion 322 of the stereoscopic image 321 is displayed, the portion 322 overlapping the partial region 301 inside the space region 300 corresponding to the relevant large block 311. In each of the blocks 312 inside each of the large blocks 311, an image of a portion corresponding to the blocks 312 in the relevant portion 322 may be displayed, Of the respective blocks 312, in the block where no image of the object to be projected to the corresponding imaging point 302 exists, the control device 22 may cause nothing to be displayed. Similarly, of the blocks 312, as to the block having the corresponding imaging point 302 located in the rear of the object when viewed from the observer side, the control device 22 may also display nothing.

The above-described correspondence relation is an example, and as long as each of the blocks set in the display region of the two-dimensional display 21 and each of the imaging points inside the space region to which the stereoscopic image is projected one-to-one correspond to each other, each of the blocks may be arranged in any way.

In the case where the collimate lens 12 is disposed so that a center of the incident surface 13a and an optical axis of the collimate lens 12 match each other in the z direction, light beams given out from two points at equal distances with the optical axis interposed along the z direction in a plane perpendicular to the optical axis and entering the light guide plate 13 through the incident surface 13a form the same angles to the diffusion surface 13b. This allows the light beams from these two points to be reflected at a same prism 131 and go toward a visual point. Therefore, these two points are seen in an overlapping manner by the observer.

Consequently, the two-dimensional display 21 of the image display device 11 is preferably disposed so that the whole display region is located on the front side or on the rear side with respect to the light guide plate 13 in the z direction. In the embodiment, the whole display region of the two-dimensional display 21 is disposed on the rear side with respect to the light guide plate 13.

Moreover, in this case, in order to increase an amount of light entering the light guide plate 13 via the collimate lens 12 from the image display device 11, as indicated by dashed line in FIG. 2, there is preferably disposed a mirror 15 disposed on an opposite side of the image display device 11 with the optical axis of the collimate lens 12 interposed in the z direction, and having a reflecting surface parallel to the emission surface 13c and directed to the image display device 11.

The collimate lens 12 is disposed between the image display device 11 and the incident surface 13a of the light guide plate 13. In the embodiment, the collimate lens 12 is disposed so that the optical axis thereof is parallel to a normal line of the incident surface 13a. The collimate lens 12 may be a bulk lens, or may be a Fresnel lens. Moreover, the collimate lens 12 may include one lens or a plurality of lenses disposed along in the y direction. Further, at least one of lens surfaces of the collimate lens 12 may be formed into an aspherical surface in order to reduce aberration.

Moreover, the collimate lens 12 may be formed integrally with the incident surface 13a. That is, the incident surface 13*a* may be formed as a convex lens surface with respect to the two-dimensional display 21.

The collimate lens 12 collimates the light beams given out from the each of the blocks on the display region of the two-dimensional display 21 of the image display device 11. For this, the two-dimensional display 21 is disposed on a focal plane of the collimate lens 12 (e.g., a position corresponding to a focal distance f=300 mm). That is, the light beams given out from each of the blocks on the display region of the two-dimensional display 21 are made into parallel light beams by the collimate lens 12 to enter the light guide plate 13. Accordingly, the light beams given out from each of the blocks on the display region of the two-dimensional display 21 enter the light guide plate 13 as the parallel light beams having different directions in accordance with the position of the block (that is, having different angles to the optical axis of the collimate lens 12 and the normal line direction of the incident surface 13*a*), and propagate inside the light guide plate 13.

The light guide plate 13 directs the light beams given out from each of the blocks on the display region of the two-dimensional display 21 of the image display device 11 to the observer side. For this, the light guide plate 13 is a transparent member formed into a flat plate (e.g., a member having sizes of 200 mm along the x direction, 300 mm along the y direction, and 2 mm along the z direction), and a side wall on a side opposed to the image display device 11 is formed as the incident surface 13*a*. The light beams entering the light guide plate 13 from the incident surface 13*a* propagate along the y direction while being totally reflected between the diffusion surface 13*b*, which is a surface on the rear side of the light guide plate 13, and the emission surface 13*c*, which is a surface on the front side of the light guide plate 13, that is, a surface opposed to the diffusion surface 13*b*.

Moreover, in the diffusion surface 13*b* of the light guide plate 13, there are formed a plurality of prisms 131 configured to reflect the light beams entering the light guide plate 13 through the incident surface 13*a* so as to emit the same toward the observer side through the emission surface 13*c*. Each of the prisms 131 is one example of a first deflector. As described in detail later, the light beams given out from the respective blocks on the display region of the two-dimensional display 21 and propagating inside the light guide plate 13 are directed to the imaging point corresponding to the relevant block by the prisms 131 and corresponding microprisms in a corresponding prism array formed in the prism array sheet 14.

Figure 4:
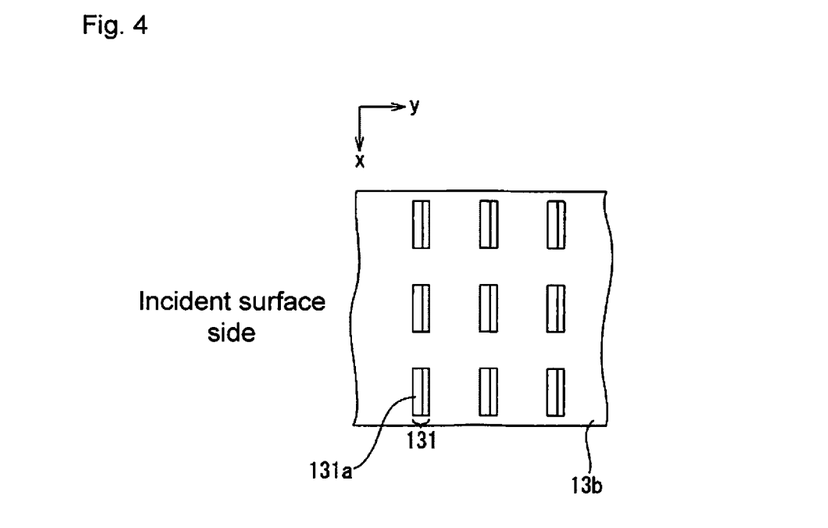
FIG. 4 is a partially enlarged view of a diffusion surface when viewed from a front side.

FIG. 4 is a partially enlarged view of the diffusion surface 13*b* viewed from the front side. The plurality of prisms 131 are arranged in a square lattice shape at a predetermined pitch (e.g., 2 mm) along the x direction and the y direction. The prisms 131 may be arranged in a zigzag shape. Each of the prisms 131 is formed, for example, as a substantially triangular groove elongated along the x direction, that is, a direction substantially parallel to a longitudinal direction of the incident surface 13*a*, and having a predetermined width (e.g., 10 μm) in the y direction. Each of the plurality of prisms 131 forms a predetermined angle α to the diffusion surface 13*b*, and has a reflecting surface 131*a* directed so as to be opposed to the incident surface 13*a*. The predetermined angle α is set to an angle that allows the light beams from the image display device 11 entering the light guide plate 13 to be totally reflected and directed to the emission surface 13*c*, for example, 35° to 45° to the diffusion surface 13*b*. While in the embodiment, the respective prisms 131 are formed so that the angle α is the same, the angle α may be different in each of the prisms 131.

Since the light beams given out from each of the blocks on the display region of the two-dimensional display 21 of the image display device 11 and entering the light guide plate 13 become parallel light beams, an angle in accordance with the position of the relevant block in an xz plane is formed to the reflecting surface 131*a* of the prism 131. Therefore, the light beams given out from the respective blocks on the display region of the two-dimensional display 21 are emitted from the emission surface 13*c* toward different directions in accordance with the position of the relevant block in the xz plane.

An arrangement density is preferably an upper limit or lower of the arrangement density that allows the observer to feel visual recognition of the object (not illustrated) in the rear of the light guide plate 13 through a transparent member or through a space where there is nothing. The arrangement density is a ratio of an area of a region where the prisms 131 are formed to an area of the diffusion surface 13*b*. Consequently, for example, the prisms 131 are preferably arranged so that the arrangement density becomes 30.0% or lower.

Alternatively, as to the light guide plate 13, a haze value is preferably an upper limit or lower of the haze value that allows the observer to feel visual recognition of the object (not illustrated) in the rear of the light guide plate 13 through a transparent member or through a space where there is nothing. The haze value indicates a ratio of diffused light to whole transmitted light. For example, the prisms 131 are preferably arranged so that the haze value becomes 28% or lower.

The prism array sheet 14 is one example of a second deflector, and for example, can be a sheet-like member formed of a transparent material with respect to visible light. The prism array sheet 14 is disposed in the front side with respect to the emission surface 13*c* of the light guide plate 13. The prism array sheet 14 directs the light beams given out from each of the blocks on the display region of the two-dimensional display 21 and emitted from the emission surface 13*c* of the light guide plate 13 to the corresponding imaging point.

Figure 5A:
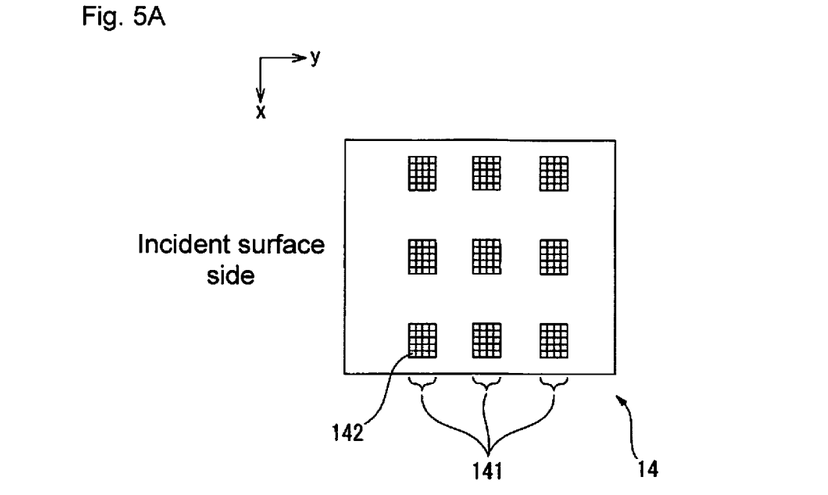
FIG. 5A is a schematic front view of a prism array sheet.
Figure 5B:
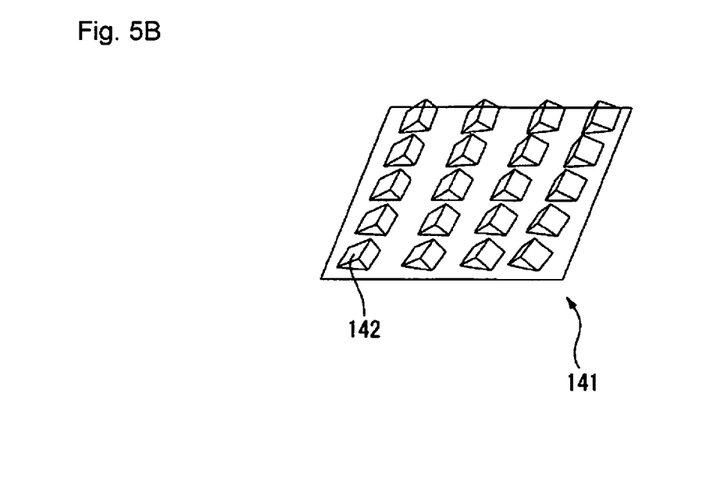
FIG. 5B is a schematic perspective view of one prism array.

FIG. 5A is a schematic front view of the prism array sheet. Moreover, FIG. 5B is a schematic perspective view of one prism array. The prism array sheet 14 has a plurality of prism arrays 141, and each of the prism arrays 141 one-to-one corresponds to any of the plurality of prisms 131. In the embodiment, since the plurality of prisms 131 are arranged in the square lattice shape at the predetermined pitch (e.g., 2 mm) in the x direction and the y direction, the prism arrays 141 are also arranged in the square lattice shape at the predetermined pitch (e.g., 2 mm) in the x direction and the y direction. Further, each of the prism arrays 141 has a same number of microprisms 142 as the number of blocks set in the display region of the two-dimensional display 21, and each of the microprisms 142 one-to-one corresponds to any of the blocks set in the display region of the two-dimensional display 21. For example, when the display region is divided into the (100 in the x direction×100 in the z direction) blocks, each of the prism arrays 141 has the (100 in the x direction×100 in they direction) microprisms 142. Portions between the adjacent microprisms 142 and portions between the adjacent prism arrays 141 may be masked with a material that does not transmit light (e.g., resin, paper or the like), or may be masked with a material having a transmittance of a predetermined value (e.g., several %) or lower (e.g., ink or the like), As described above, the light beams given out from each of the blocks on the display region of the two-dimensional display 21 are collimated by the collimate lens 12, and are emitted from the emission surface 13c toward the different directions in accordance with the position of the relevant block in the xz plane. Therefore, the light beams given out from each of the blocks and emitted from the emission surface 13c are transmitted at different positions at a time point when they are transmitted through prism array sheet 14 in accordance with the position of the relevant block in the xz plane. Consequently, each of the microprisms 142 is formed in a predetermined size (e.g., 10 μm×10 μm) at the positions where the light beam from the corresponding block is transmitted through the prism array sheet 14, Each of the microprisms 142 directs the light beam from the corresponding block to the imaging point corresponding to the block. For this, each of the plurality of microprisms 142 is formed, for example, as a substantially triangular groove or a substantially triangular projection when viewed from a side surface in any one of a surface of the prism array sheet 14 on the side opposed to the emission surface 13c and a surface on the observer side. Each of the plurality of microprisms 142 has a refractive surface configured to refract the light beam from the block corresponding to the relevant microprism 142 toward the corresponding imaging point. An angle of the refractive surface to the emission surface 13c is set in accordance with a refractive index of the material forming the prism array sheet 14, a direction of the light beam from the corresponding block entering the relevant microprism 142, and a positional relation between the relevant microprism 142 and the corresponding imaging point.

The collimate lens 12, the light guide plate 13, and the prism array sheet 14 are each formed, for example, by molding a transparent material with respect to visible light, for example, resin such as polymethyl methacrylate (PMMA), polycarbonate, and cycloolefin polymer.

Figure 6:
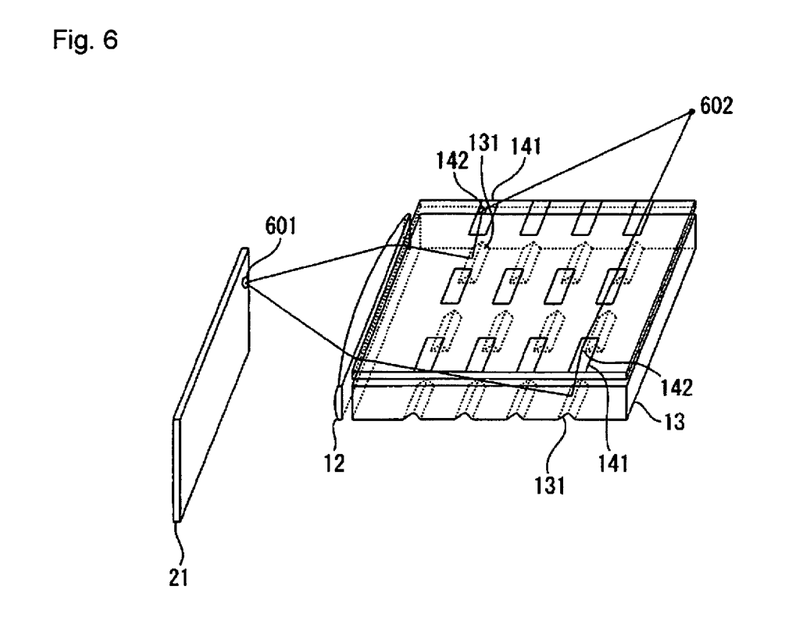
FIG. 6 is a view illustrating one example of a relation between a position of the block on the display region of the two-dimensional display, and a corresponding microprism in each of the prism arrays.

FIG. 6 is a diagram illustrating one example of a relation between the position of the block on the display region of the two-dimensional display 21, and the corresponding microprisms 142 in the respective prism arrays 141. The light beams given out from a block 601, collimated by the collimate lens 12, and entering the light guide plate 13 are emitted toward the same direction by the respective prisms 131. Accordingly, the respective relevant light beams are refracted toward an imaging point 602 by the microprisms 142 at the same positions in the respective prism arrays 141. As a result, since the light beams from the respective prism arrays 141 in the mutually different directions are condensed at the imaging point 602, an image displayed in the block 601 is projected at the imaging point 602.

As described above, the stereoscopic display device collimates the light beams given out from each of the blocks on the display region of the two-dimensional display of the image display device and causes the light beams to enter the light guide plate, by which information of the position of the block transforms the information of the position of the block to the direction of the light rays. This stereoscopic display device causes the light beams from each of the blocks to be emitted in the different directions in a unit of block by the plurality of prisms provided in the diffusion surface of the light guide plate. In this stereoscopic display device, the light beams from each of the blocks are directed to the imaging point corresponding to the relevant block by the prism arrays of the prism array sheet corresponding to the relevant prisms of the light guide plate. Thereby, the stereoscopic display device can display the stereoscopic image of the object as aggregate of the light beams condensed at the imaging points without using the object to be projected itself. Moreover, in this stereoscopic display device, since with respect to each of the imaging points, the light beams directed to the imaging point from the respective prisms of the light guide plate exist, the observer can visually recognize the stereoscopic image from a wide range. Further, since by changing the image of the object that the image display device displays, the different stereoscopic images can be projected, this stereoscopic display device can project a dynamically stereoscopic image without using a mechanism configured to mechanically operate. Further, in this stereoscopic display device, since the light guide plate is transparent, the observer can visually recognize both the object in the rear of the light guide plate and the projected stereoscopic image.

The set space region is not limited to the above-described embodiment. For example, while in the example of FIG. 3, one surface of the space region is set to be substantially parallel to the emission surface 13c of the light guide plate 13, the present invention is not limited thereto, the space region may be set so that a surface on a side opposed to the emission surface 13c is inclined to the emission surface 13c. Further, the space region does not have the stereoscopic region shape as in the example of FIG. 3, but it may be set as a spherical region, a cylindrical region, or a triangular pyramid shaped or cone-shaped region. Alternatively, the space region may be set to be planar. Furthermore, the imaging points need not be set at equal intervals, but for example, a distance between the adjacent imaging points may become smaller as the imaging points are closer to a center of the space region, or as the imaging points are closer to the observer side.

In some projected objects, there is a case where although as to several imaging points, when the observer views the imaging points from a certain viewpoint, the imaging points are located in the rear side of the object, when the observer views the imaging points from another viewpoint, the imaging points is located on the front side. Consequently, when the stereoscopic display device 1 projects a stereoscopic image of a stationary object, as to the imaging point located on the rear side of the object when viewed from a predetermined viewpoint, and located on the front side of the object when viewed from another viewpoint, the microprism corresponding to the light beam directing to the predetermined viewpoint may be masked with an opaque member. Since this blocks out the light beam from the point of the object that originally should not be visible from the certain point, a more natural stereoscopic object is reproduced.

According to a modification, each of the microprisms 142 that the prism array sheet 14 has may have a power to image, at the corresponding imaging point, the parallel light beams from the corresponding block on the display region of the two-dimensional display, which parallel light beams are emitted from the light guide plate the parallel light beams are emitted from the light guide plate. For this, for example, the refractive surface of each of the microprisms 142 may be formed into a spherical shape convex on the air side. Moreover, the power of each of the microprisms 142 may be set to a reciprocal number of a distance from a position of the relevant microprism 142 to the corresponding imaging point, that is, so that the distance becomes a focal distance.

Figure 7A:
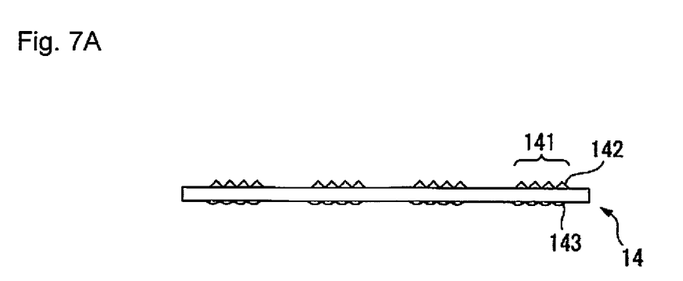
FIG. 7A is a schematic side view of the prism array sheet according to a modification.

FIG. 7A is a schematic side view of the prism array sheet according to another modification. In this modification, a microlens 143 is formed so as to one-to-one correspond to each of the microprisms 142 in a surface on an opposite side of the surface of the prism array sheet 14 where each of the microprisms 142 is formed. In this case, each of the microlens 143 may be formed for each of the microprisms 142 so that the parallel light beam from the block on the display region of the two-dimensional display, which parallel light beam is transmitted through the microprism, is transmitted through the corresponding microlens 143. A power of each of the microlenses 143 may be decided so that the parallel light beam transmitted through the relevant microlens 143 is imaged at the imaging point corresponding to the microlens 143.

Figure 7B:
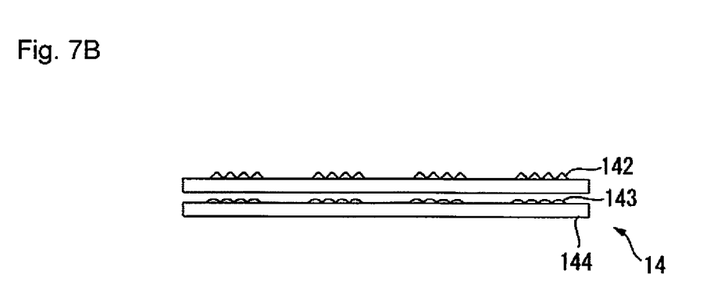
FIG. 7B is a schematic side view of the prism array sheet according to a modification.

FIG. 7B is a schematic side view of the prism array sheet according to still another modification. In this modification, the microlenses 143 are formed in a sheet-like member 144 provided separately from the prism array sheet. In this case, the member 144 may be provided between the emission surface of the light guide plate 13 and the prism array sheet, or on the observer side with respect to the prism array sheet.

Furthermore, when as to each of the plurality of microprisms 142 arranged adjacent to each other, a difference in the distance from the microprism to the corresponding imaging point is within a predetermined allowance range, one microlens may be provided for the plurality of microprisms 142. In this case, the predetermined allowance range is set in accordance with allowable image quality of the stereoscopic image.

Figure 8A:
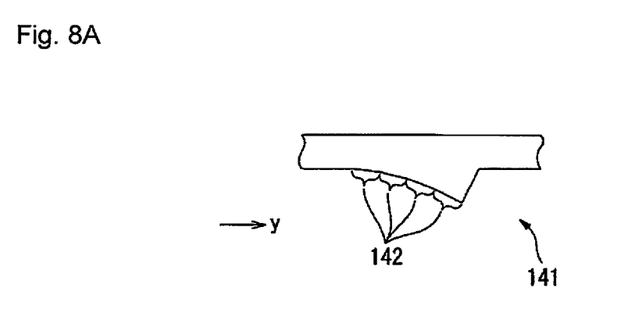
FIG. 8A is a partially enlarged view of the prism array sheet where the microprisms are formed integrally.
Figure 8B:
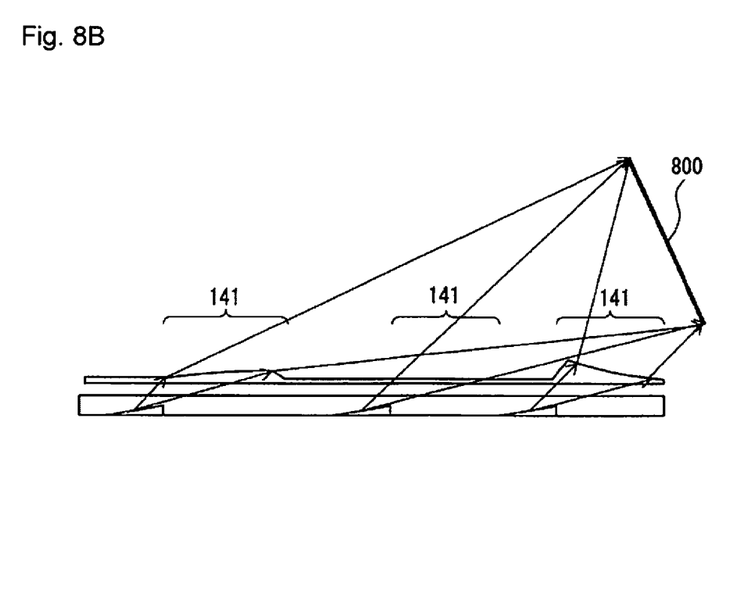
FIG. 8B is a schematic side view of the prism array sheet and a light guide plate according to this modification.

According to still another modification, the adjacent plurality of microprisms may be formed integrally. FIG. 8A is a partially enlarged view of the prism array sheet where the microprisms are formed integrally. When the respective blocks corresponding to the plurality of imaging points arranged side by side along the x direction are also arranged side by side in the x direction on the display region of the two-dimensional display 21, the microprisms 142 corresponding to the imaging points and the blocks are arranged side by side along the x direction as well. Further, the power of the collimate lens 12 and distances from the prism array sheet 14 to those imaging points are properly set, by which inclinations of the refractive surfaces of the microprisms 142 corresponding to the imaging points and the blocks to a yz plane can be made the same. Accordingly, in this case, as to the respective microprisms 142 arranged side by side in the y direction corresponding to each of the large blocks illustrated in FIG. 3, only the inclinations to the xy plane may be changed. Therefore, as illustrated in FIG. 8A, for each group of the microprisms corresponding to the same imaging points in the x direction and the z direction, each of the prism arrays 141 may be formed as a prism obtained by joining the refractive surfaces each having the inclination to the xy plane, the refractive surfaces being equivalent to the respective microprisms 142 arranged side by side in the y direction. This reduces microstructures in the prism array sheet 14, which makes manufacturing of the prism array sheet 14 easier. FIG. 8B is a schematic side view of the prism array sheet and the light guide plate according to this modification. In this modification, by properly adjusting the refractive surfaces of the integrated microprisms for each portion of the prism array 141 corresponding to the one large block illustrated in FIG. 3, a position of a partial region 800 in the space region corresponding to the large block can be arbitrarily set.

According to still another modification, in place of the microprisms 142 included in each of the prism arrays 141, lenses may be used. In this case, an optical axis direction of each of the lenses is set in accordance with a power of the lens, a direction of the light beam from the corresponding block entering the lens, and a positional relation between the lens and the corresponding imaging point so that the light beam from the corresponding block is directed to the corresponding imaging point. In this case as well, the power of each of the lenses may be set so that a reciprocal number of a distance from a position of the relevant lens to the corresponding imaging point.

According to still another modification, a plurality of space regions to each of which the stereoscopic image is projected may be set. In this case as well, in each of the space regions, the plurality of imaging points are set as described in the foregoing embodiment. The display region on the two-dimensional display may be divided into a same number of blocks as a total number of imaging points in the respective space regions. Each of the blocks may be one-to-one associated with any of the imaging points of the plurality of space regions to display an image of an object at the imaging point. Moreover, each of the microprisms included in each of the prism arrays formed in the prism array sheet may also be formed so as to direct the parallel light beam transmitted through the microprism to the imaging point of any of the space regions corresponding to the block giving out the parallel light beam. This allows the stereoscopic display device to simultaneously display a plurality of stereoscopic images mutually different at mutually different positions.

Alternatively, in each of the space regions, a same number of imaging points may be set. The display region on the two-dimensional display may be divided into the same number of blocks as a number of imaging points included in one of the space regions. In this case, the refractive surface of each of the microprisms included in each of prism arrays formed in the prism array sheet is divided into a same number of sub-refractive surfaces as the number of space regions. Each of the sub-refractive surfaces is formed so as to direct the parallel light beam transmitted through the relevant microprism to the corresponding imaging point in each of the space regions. This allows the stereoscopic device to simultaneously project the same stereoscopic image at the different positions.

According to still another modification, the light guide plate 13 may emit the light beams propagating inside the light guide plate 13 from the emission surface 13c with a manner other than the above-described prisms.

Figure 9:
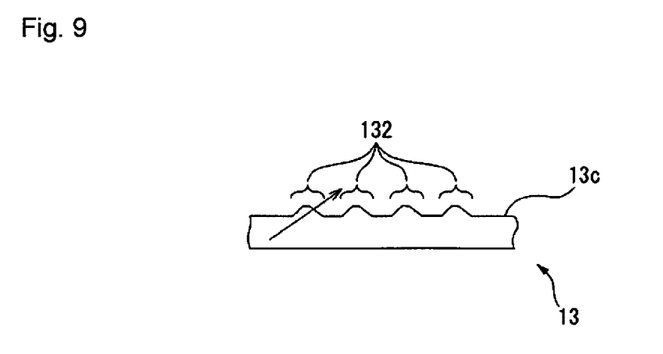
FIG. 9 is a schematic side cross-sectional view of the light guide plate according to another modification.

FIG. 9 is a schematic side cross-sectional view of the light guide plate 13 along the y direction according to this modification. In this modification, the light guide plate 13 has a plurality of prisms 132 arranged at a predetermined pitch along the x direction and the y direction in the emission surface 13c in place of the prisms formed in the diffusion surface 13b.

In this modification, each of the prisms 132 projects on the front side with respect to the emission surface 13c, and is formed as a substantially triangular projection extending along the x direction. Therefore, when the light beam from the two-dimensional display 21 of the image display device 11, which enters from the incident surface 13a, enters any of the prisms 132, the light beam is refracted at a refractive surface on the opposite side of the incident surface 13a, and is emitted to the front side, According to still another modification, in the light guide plate 13, in place of the prisms, diffraction gratings may be formed in the diffusion surface 13b at a predetermined pitch along the x direction and the y direction, the diffraction gratings each configured to change a reflection direction of the light beam to a direction in which the light beam is emitted without being totally reflected at the emission surface 13c. In this case, each of the diffraction gratings has, for example, a plurality of grooves arranging side by side along the y direction, and extending along the x direction.

According to still another modification, the incident surface may be formed so that an angle formed between the incident surface and the emission surface of the light guide plate is an angle other than a right angle. For example, as disclosed in Japanese Unexamined Patent Publication No. 2011-186332, the incident surface may be formed into a tapered shape. Alternatively, the incident surface may be formed parallel to the emission surface or the diffusion surface, and a surface of the light guide plate on a side opposed to the incident surface may be formed so as to form 45° to the emission surface or the diffusion surface. Since this can make smaller an angle formed between the two-dimensional display and the emission surface of the light guide surface, the stereoscopic display device can be thinned.

According to still another modification, the collimate lens 12 may be cylindrical lens configured to collimate the light beams from each of the blocks of the two-dimensional display 21 of the image display device 11 with respect to only the yz plane, that is, only a direction perpendicular to the longitudinal direction of the incident surface 13a of the light guide plate 13, or may be a toric lens configured to collimate the light beams from each of the blocks with respect to the yz plane, and condense the light beams with respect to the xz plane. In this case as well, at the position of each of the prisms 131 of the light guide plate 13, the direction of the principal ray from each of the blocks differs in accordance with the position of the relevant block, in the prism array 141 corresponding to each of the prisms 131. Therefore, as in the above-described embodiment, the microprism 142 corresponding to the relevant block may be provided at a position that the principal ray from each of the block passes.

In the above-described embodiment and modifications, the light guide plate 13 may not be formed into a flat plate, but into a plate with the curved emission surface 13c. This also enables the light guide plate 13 to be disposed along a member formed into a curved surface shape, such as, for example, a front glass of a vehicle, which can increase a freedom degree of disposition of the stereoscopic display device.

INDUSTRIAL APPLICABILITY

This stereoscopic display device can be utilized for various purposes. For example, this stereoscopic display device can be utilized in a head-up display or a digital signage system. Moreover, this stereoscopic display device may be disposed so that the emission surface of the light guide plate is located on any of a floor surface, a wall surface, and a ceiling surface.

In this manner, those in the art can make various modifications in accordance with the embodiment to be carried out within a range of the present invention.

DESCRIPTION OF SYMBOLS 1 stereoscopic display device
11 image display device
21 two-dimensional display
22 control device
12 collimate lens
13 light guide plate
13a incident surface
13b diffusion surface
13c emission surface
131, 132 prism
14 prism array sheet
141 prism array
142 microprism
143 microlens

The invention claimed is:

1. A stereoscopic display device comprising:
an image display device comprising a display region comprising a plurality of blocks configured to display a contoured image portion of an object, each block comprising a plurality of sub-blocks, such that each of the sub-blocks corresponds to one of a plurality of imaging points in a space region, the plurality of imaging points forming a stereoscopic image of the object;
a first lens configured to direct light beams emitted from each of the plurality of sub-blocks in a plurality of mutually different directions;
a transparent light guide plate that receives the light beams emitted from each of the plurality of sub-blocks, directed by the first lens in the plurality of mutually different directions, wherein the light guide plate comprises:
an incident surface at a side of the light guide plate into which the light beams are directed, the incident surface opposed to the display region of the image display device, wherein the first lens is located between the display region of the image display device and the incident surface;
a plurality of first deflectors provided in one of: a diffusion surface of the light guide plate at a rear side; and an emission surface of the light guide plate at a front side; and
a second deflector comprising a transparent sheet opposed to the emission surface of the light guide plate and a plurality of refractive surfaces,
wherein
each one of the plurality of refractive surfaces corresponds to one of the plurality of first deflectors in a one-to-one fashion such that light beams emitted from each one of the plurality of sub-blocks are directed by the first lens in the one of the plurality of mutually different directions to enter the light guide plate and are emitted by the corresponding one or more of the plurality of refractive surfaces of the second deflector to the corresponding one of the plurality of imaging points so as to form the stereoscopic image in the space region.

2. The stereoscopic display device according to claim 1, wherein the first lens collimates the light beams emitted from each of the plurality of sub-blocks in at least directions perpendicular to a longitudinal direction of the incident surface to direct the light beams emitted from each of the plurality of sub-blocks in the plurality of mutually different directions.

3. The stereoscopic display device according to claim 1, wherein the second deflector comprises: a prism; or a second lens with respect to each of the plurality of first deflectors, the prism or the second lens configured to direct the light beams to the corresponding imaging point of the plurality of imaging points in a unit of the light beams from each of the plurality of sub-blocks emitted from the emission surface through the corresponding first deflector.

4. The stereoscopic display device according to claim 1, wherein by transforming coordinates of each point of the object represented in a first coordinate system to coordinate values of a second coordinate system set in the predetermined space region, the image display device specifies the point of the object at each of the plurality of imaging points to display the image of the object at the specified point in the corresponding sub-block.

* * * * *